United States Patent
Ulano

[11] 4,018,263
[45] Apr. 19, 1977

[54] METHOD AND APPARATUS FOR GENERATING AND STORING GASEOUS FLUIDS

[76] Inventor: Bernard Ulano, 1952 Coldwater Canyon, Beverly Hills, Calif. 90210

[22] Filed: Apr. 17, 1975

[21] Appl. No.: 568,926

[52] U.S. Cl. .................................. 165/1; 122/28; 122/31 R
[51] Int. Cl.² .......................................... F22B 1/02
[58] Field of Search ............... 122/31 R, 28; 165/1

[56] References Cited
UNITED STATES PATENTS

| | | | |
|---|---|---|---|
| 1,678,819 | 7/1928 | Koch | 122/31 R |
| 2,954,013 | 9/1960 | Stengel | 122/31 R |
| 2,991,987 | 7/1961 | Heinze | 122/31 R |
| 3,032,482 | 5/1962 | Shoemaker | 122/31 R |
| 3,073,683 | 1/1963 | Switzer | 122/31 R |
| 3,861,148 | 1/1975 | Bailey | 122/31 R |

FOREIGN PATENTS OR APPLICATIONS

| | | | |
|---|---|---|---|
| 363,684 | 6/1930 | United Kingdom | 122/31 R |

*Primary Examiner*—C. J. Husar
*Assistant Examiner*—Daniel J. O'Connor
*Attorney, Agent, or Firm*—Blakely, Sokoloff, Taylor & Zafman

[57] ABSTRACT

Apparatus for generating and storing under pressure vaporized reactants consisting of a heat exchanger in fluid communication with an expansion chamber comprising a lower header and an upper header. At least one duct extends between the lower and upper headers for communication therebetween. A collection vessel communicates with the upper header by means of at least one riser.

Heat exchange fluid is heated to operating temperature and circulated through the lower header to the upper header and returned to the heat exchanger. A reactant is introduced into the heat exchange medium and is vaporized thereby. The vapors are confined in heat exchange medium and circulated to the expansion chamber where the vapors escape from the heat exchange medium. The vapors are led by the riser to the collection vessel where they are stored under pressure at sufficient temperature to prevent condensation. Upon demand, the vaporized reactants are driven from the collection vessel by the force of the storage pressure to a reaction chamber for vapor phase reaction.

10 Claims, 1 Drawing Figure

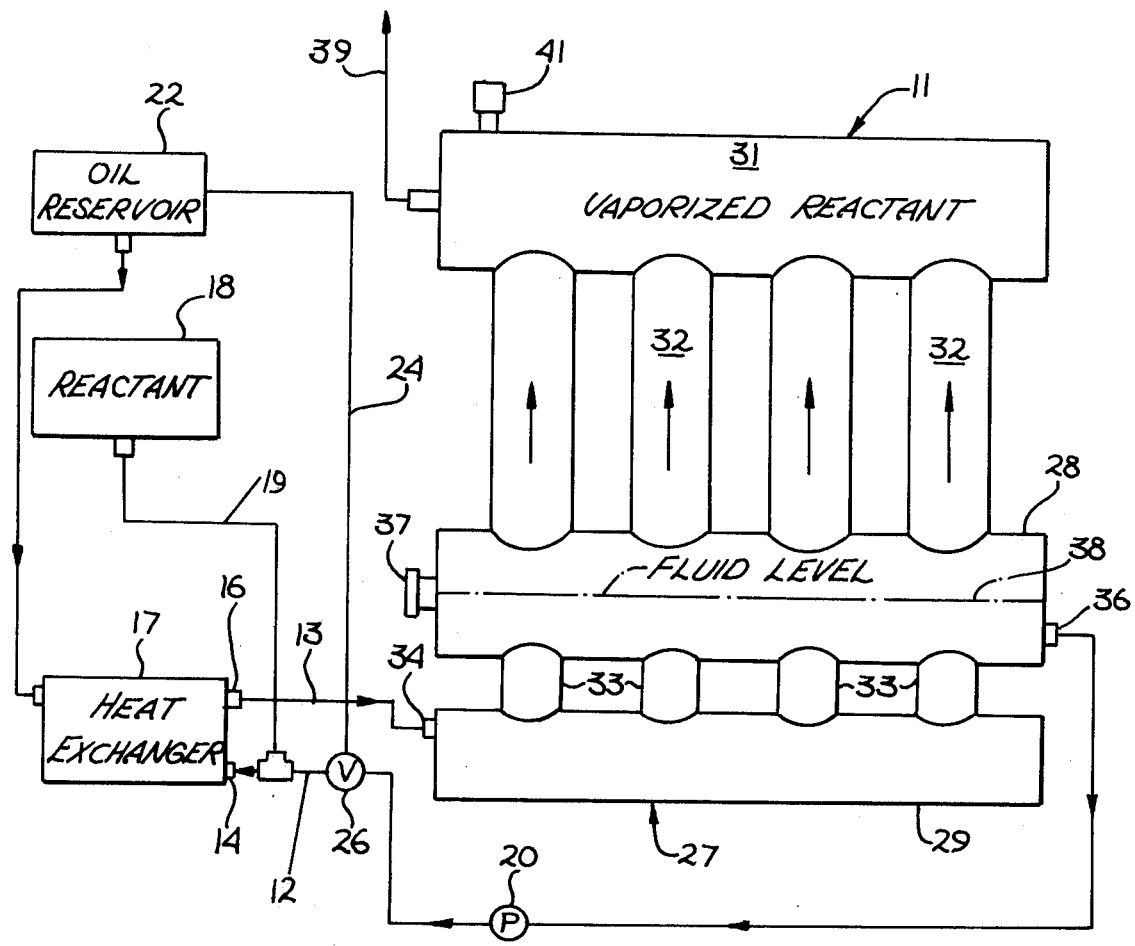

METHOD AND APPARATUS FOR GENERATING AND STORING GASEOUS FLUIDS

BACKGROUND OF THE INVENTION

This invention relates to vapor phase reactions and more particularly to a method and apparatus for generating and storing vaporized reactants.

Many processes involve the reaction of one or more reactants while in the vapor phase. Such vapor phase processes are utilized, for example, in the textile industry for imparting certain desirable characteristics to the textile thus treated. An example of such a reaction involves the treatment of cellulosic fiber with a vapor phase mixture of formic acid and formaldehyde to render the cellulosic fiber shrink resistant and crease resistant.

Generally, vapor phase reactions require an apparatus particularly designed for the purpose. Such apparatus normally comprises a reaction chamber or vessel for receiving and confining vapors during the reaction, suitable means for moving the vapors into the reaction chamber and heat exchange means for vaporizing the reactants normally prior to being led into the reaction chamber. The prior art processes are generally limited by the rate at which the reactants can be vaporized and led to the reaction chamber. Also a heavy demand for reactants in the reaction chamber may result in a depletion of reactants because the generation system is unable to supply the additional vaporized reactants required. Such a depletion of reactants requires that reaction time be increased to insure a complete reaction or, in the case of an automated system, the reaction is not complete because of an insufficiency of reactant.

SUMMARY OF THE INVENTION

The present invention resides in an improved method and apparatus for vaporizing and storing reactants whereby a reserve of vaporized reactants is maintained in a pressurized condition and the reactant is driven by the force of its own pressure into the reaction chamber as required. In this manner a substantially uniform supply of vaporized reactant is provided, undesirable fluctuations in reactant concentrations in the reaction chamber is avoided and the production rate of the vapor phase process substantially increased.

More particularly, the method of the present invention comprises introducing a vaporizable reactant in liquid or solid form into a fluid heat exchange medium under confined conditions wherein the reactant is vaporized and entrained in the heat exchange medium. The medium and entrained vaporized reactant are led into a first chamber and maintained therein under non-confined conditions whereby at least a portion of the entrained vaporized reactant rises from the medium and is led into a storage vessel which is also maintained at a sufficiently high temperature to keep the reactant in the vaporized form. The medium is then returned to the heat exchanger for vaporizing contact with additional reactant.

The vaporized reactant is maintained in the storage vessel under pressure and at sufficient temperature to maintain it in the vaporized state. Upon demand, the pressurized and vaporized reactant is led from the storage vessel to the reaction chamber for vapor phase reaction. In a preferred embodiment of the present invention, pressure in the storage chamber is generated by vaporized reactant contained therein and a drop in pressure in the storage chamber is compensated for by increasing the amount of medium containing entrained vaporized reactant flowing into the first chamber so that the rate of replenishment of vaporized reactant in the storage chamber is increased to replace the used reactant and to return the storage chamber to its desired storage pressure.

The generator of the present invention comprises generally an expansion chamber into which heated media containing entrained vaporized reactant is introduced and the entrained reactant allowed to escape from the heated medium. A storage tank communicates with the expansion chamber by means of one or more risers through which the vaporized reactant leaving the expansion chamber is led into the storage vessel.

A conventional heat exchanger is connected to the expansion chamber for fluid communication therebetween and conventional pump means are provided for pumping heated media containing entrained vaporized reactant into the expansion chamber and for returning media from which at least a portion of the entrained vaporized reactant has been removed back to the heat exchanger. The generator of the present invention is suitably insulated, as are the lines leading to and from the generator, to reduce thermal losses.

Other objects and advantages of the present invention will become apparent be reference to the drawing and the following detailed description of the invention.

BRIEF DESCRIPTION OF THE INVENTION

The drawing is a schematic diagram of a vaporized reactant generator in accordance with the present invention and illustrating the steps of the process of the present invention.

DETAILED DESCRIPTION OF THE INVENTION

In accordance with the present invention, reactants are vaporized and retained under pressure in vapor form for subsequent vapor phase reactions. By retaining the vaporized reactants under pressure and at sufficient temperature, a source of vaporized reactant is constantly available upon demand for utilization in vapor phase reactions. Variations in demand for reactants can, therefore, be anticipated so that gaseous reactants are available to the reaction zone upon demand and undesirable fluctuations in the supply of reactants is avoided. In addition, by maintaining the vaporized reactants under pressure, an external driving means, such as a pump or the like, is not required for moving the vaporized reactant from the storage vessel to the reaction zone.

As is more clearly shown in the FIGURE, a generator, shown generally as 11, and adapted for use of a liquid heat exchange medium, is interconnected by lines 12 and 13 to an inlet 14 and an outlet 16, respectively, of a conventional heat exchanger 17. The reactants are introduced, in liquid or solid form, at the inlet 14 of the heat exchanger 17 from a suitable container 18 through a line 19. A pump 20 is provided in the line 12 for circulating a heat exchange medium through the heat exchanger 17 and the generator 11. A reservoir 22 is in communication with the heat exchanger 17 be means of a line 23 for introducing make up fluid exchange medium and a line 24 extends between the reservoir and a two-position valve 26 in the line 12 for returning medium to the reservoir in the event that the fluid level of the heat exchange medium in the generator 11 becomes too high.

The generator 11 comprises an expansion chamber, shown generally as 27, comprising an upper header 28 and a lower header 29 and a collection vessel 31, which is in communication with the expansion chamber by means of risers 32. Although the expansion chamber 27 may comprise a single large container, in the illustrated preferred embodiment the expansion chamber is defined by a plurality of smaller containers, i.e. the upper header 28 and the lower header 29, which are in communication by means of ducts 33. The capacity of the expansion chamber can thus be increased as desired by adding additional headers and ducts.

The lower header 29 is provided with an inlet coupling 34 to which the line 13 leads from the outlet 16 of the heat exchanger 17 for fluid communication between the lower header and the outlet of the heat exchanger. An outlet coupling 36 is provided in the upper header 28 for connection to the line 12 leading to the inlet 14 of the heat exchanger 17. A sight port 37 is disposed in one end wall of the upper header 28 for observing the level of the heat exchange medium in the upper header.

The heat exchange fluid in the expansion chamber 27 is maintained at a level so that the expansion chamber is less than completely full. As is more specifically shown in the FIGURE, the fluid level 38 in the upper header 28 is preferably maintained at substantially half of the capacity of the upper header. If a single expansion chamber is utilized, the level would be maintained in a similar manner so that it would not be completely full.

The collection vessel 31 defines a chamber for the pressurized containment of vaporized reactants rising from the upper header 28 through the risers 32. A line 39 leads from the collection vessel 31 to a reaction chamber, not shown, a pressure relief valve 41 is provided on the collection vessel 31 for venting the interior of the collection vessel in the event pressure safety limits are exceeded.

In the preferred embodiment, the lower header 29, the upper header 28, and the collection vessel 31 are substantially vertically aligned so that the vaporized reactant can travel in a substantially straight upward path to the collection vessel 31. It should be noted, however, that other configurations may be utilized depending upon the space available and the like. For example, the collection vessel 31 can be in the form of toroid surrounding the expansion chamber 27 and with the risers 32 extending radially outwardly from the expansion chamber to the collection vessel.

The generator 11 is thoroughly insulated to reduce thermal loss from both the collection vessel 31 and the expansion chamber 27. Alternatively, the generator 11 may be jacketed and a heat exchange media circulated through the jacket at sufficient temperature to maintain adiabatic conditions within the generator.

The heat exchange medium used in the present invention is a medium which is inert to the reactant at operating temperatures and which does not interfere with the vapor phase reaction should the medium be carried into the reaction chamber. The medium may be a gaseous fluid, such as, for example, nitrogen and the other inert gases. Water, in liquid or steam form also is an excellent heat exchange medium. Air can also be used as a heat exchange medium depending on the reactants utilized. Good results are obtained using the high level heat transfer liquid such as, for example, dibutyl phthlates, phenolic ethers, chlorinated diphenyls and terphenyls, silicone fluids, such as the polydimethylsiloxenes and the polymethylphenolsiloxenes, alkanes, such as paraffin, and petroleum oils, such as mineral oil. The choice of heat exchange fluid utilized depends on the nature of the reactant to be vaporized and the operating conditions required for the vaporization.

One of the preferred heat exchange media in the present invention is the eutectic mixture of about 73.5% diphenyl oxide and 26.5% diphenyl. This material is heat stable at temperatures up to about 380° C and is non-corrosive and inert to most reactants. The above mentioned medium is available from the Dow Chemical Company under the trademark "Dow THERM A". Also, excellent results have been obtained using dibutytl phthlate as a preferred heat exchange medium.

In carrying out the method of the present invention, the heat exchanger 17 and the pump 20 are activated and the heat exchange medium is circulated between the heat exchanger and the expansion chamber 27 of the generator 11. When the heat exchange medium has reached the vaporization temperature for the reactant being vaporized, the reactant is introduced into the heat exchange medium for vaporization by the heat exchange medium.

The heat exchange medium and reactant, at least partially vaporized and entrained in the medium, are led into the expansion chamber 27. The expansion chamber 27 has a cross-sectional area substantially greater than the line 13 leading from the heat exchanger 17, thus allowing the entering stream of medium to expand producing a resultant pressure drop and reduction in flow velocity. The reduction in pressure and velocity thus allows the vaporized reactant to move upwardly through the fluid media where it eventually leaves the liquid media at the upper portion of the expansion chamber 27.

In the preferred embodiment, as illustrated in the FIGURE, the flow of the media-reactant is from the heat exchanger 17 through the line 13 to the lower header 29 which forms a portion of the expansion chamber 27. The vaporized reactant passes through the conduits 33 into the upper header 28 where it leaves the liquid media. The passage of the vaporized reactant from the lower header 29 to the upper header 28 is aided by the circulation of the liquid heat exchange medium which also flows from the lower header through the conduits 33 and exits from the upper header through the outlet coupling 36 for return through the line 12 to the heat exchanger 17 for further heating. Thus, the flow of the vaporized reactant is generally concurrent with the flow of the liquid medium while in the expansion chamber 27.

It should be noted that any reactant remaining entrained in the liquid medium as it leaves the expansion chamber 27, is returned to the heat exchanger 17 for recirculation to the expansion chamber.

The vaporized reactant having once left the liquid heat exchange medium then passes through the risers 32 into the collection vessel 31 where it is retained under pressure until required for vapor phase reaction in the reaction chamber.

The vaporized reactant is held in the collection vessel 31 at sufficient temperature and pressure as to maintain the reactant in the vaporized condition. Thus, it is essential that the pressure in the collection vessel be maintained at a point below the vapor pressure of the reactant at the temperature at which it is stored. For the purposes of the present invention, the vaporized reactants are treated as ideal gases and consequently, the temperature-pressure relationships required in the collection vessel are readily determined by application of the ideal gas laws.

In accordance with the foregoing, the precise pressure levels maintained in the collection vesel 31 are directly related to the storage temperature and the nature of the reactant. However, the minimum storage pressure is maintained above the pressure in the reaction chamber so that a positive pressure differential between the collection vessel 31 and the reaction chamber is maintained. Normally, the pressure in the reaction chamber is atmospheric pressure (0 psig) so that the minimum allowable pressure in the collection vessel 31 must be greater than 1 atmosphere (e.g. in the order of 3 psig has been found to be sufficient). Should the reaction chamber be maintained under vacuum or under pressure greater than atmospheric, the pressure in the collection vessel 31 must be adjusted accordingly so as to maintain a positive pressure differential as discussed above. The upper pressure limit is determined largely by the operating temperature and the vapor pressure of the reactant.

The selected operating temperature is primarily dependent upon the boiling point of the reactant being vaporized. Thus, the operating temperature of the generator 11 is maintained at a level that will maintain the reactant in vapor form. The upper limit is determined by the decomposition temperatures of the heat exchange medium and the reactant and for reasons of economy the operating temperature is preferably maintained as low as reasonably necessary to maintain the reactant in vaporized form. In certain cases, as for example, with formaldehyde in Example I, the operating temperature is set at a level that will not only maintain the reactant in vapor form but which will also retard or eliminate an undesirable chemical activity (e.g. polymerization) while the reactant is within the generator 11.

In the preferred embodiment, the temperature within the collection vessel 31 is generated and maintained by the heat exchange medium. Consequently, the temperature within the collection vessel 31, the risers 32, the upper header 28, and the lower header 29, is maintained at substantially the selected operating temperature that is at least above the boiling point of the reactant. The upper limit of operating temperature within the generator 11 is primarily limited by economy, the decomposition temperature of the heat exchange medium, and the stability of the vaporized reactant.

The pressure in the collection vessel 31 is generated by the vaporized reactant in accordance with the ideal gas laws. When the desired pressure is reached, the generation of additional vaporized reactant is terminated by stopping the flow of fresh reactant to the heat exchanger 17 from the reactant container 18. The circulation of heat exchange medium, however, is continued in order to maintain operating temperature in the generator and particularly in the collection vessel 31.

In this manner, equilibrium conditions are established in the generator 11 and the vaporized reactant is stored under pressure in the collection vessel 31 and risers 32. In this manner the reactant can be maintained in its vaporized condition for substantial periods of time. By maintaining the flow of heat exchange media through the expansion chamber 27 any reactant which may be condensed, such as on the walls of the collection vessel 31 or risers 32 will flow back into the heat exchange medium in the expansion chamber 27 and will there be revaporized and returned in vapor form to the collection vessel.

As vaporized reactant is demanded in the reaction chamber, its removal causes a resultant drop in pressure in the collection vessel 31. At this point, additional reactant is introduced to the heat exchange medium for generation of vaporized reactant to replace the utilized vaporized reactant and to restore the pressure in the collection vessel 31.

In the Examples formaldehyde and formic acid are vaporized in accordance with the method and apparatus of the invention. It should be clear when following the principles of the invention that the choice of material to be vaporized is not critical. It is preferred, however, that the vaporized material be stable in the vaporized form at the operating temperature although it will be seen, in the case of formaldehyde which tends to polymerize while in the vaporized form, that storage conditions can be selected to maximize the stability of the vaporized material contained in the collection vessel 31.

The following specific examples illustrate the manner in which certain reactants are vaporized in accordance with the present invention. Although, the examples describe certain specific embodiments, the invention is not to be construed as being limited to the particular embodiments as set forth in the Examples.

EXAMPLE I

Apparatus of the type shown in the FIGURE is utilized for the preparation of vaporized formaldehyde and for the storage thereof for subsequent use in a vapor phase reaction of formaldehyde and formic acid with cellulosic fibers. The components of the generator 11 are constructed of AISI 316 stainless steel for corrosion resistance and are of sufficient gauge to withstand pressures of at least 6 atmospheres.

Formaldehyde is readily vaporizable and can be maintained at pressures of between about 5 and about 6 atmospheres and at temperatures as low as 30° C without exceeding its vapor pressure. However, formaldehyde vapors will polymerize at temperatures below 120° C at ambient pressure. Therefore, the temperature at about 1 atmosphere should be at least 120° C. Generally, the pressure in the collection vessel for a reaction chamber at atmospheric pressure will be slightly greater than 1 atmosphere (e.g. 3 psig). At 5 atmospheres pressure, for example, it is desirable to maintain the formaldehyde at 150° C in order to avoid polymerization. At 6 atmospheres, it is desirable to maintain the formaldehyde below about 200° C for safety purposes and to avoid polymerization. The aforesaid temperatures are also, of course, well above the vaporization temperature of formaldehyde and, accordingly, can be selected as the operating temperatures.

A sufficient quantity of the desired heat exchange medium (e.g. Dow THERM A or dibutyl phthlate) to fill the lower header 29, the conduits 33 and approximately one half of the upper header 28 is introduced to the generator 11. The pump 20 and the heat exchanger 17 are activiated to circulate and heat the heat exchange liquid to operating temperature.

Heating and circulation of the heat exchange medium is continued until the heat exchange medium brings the temperature in the interior of the generator 11, including the collection vessel 31, to the operating temperatures of about 120° to about 200° C (between about 1 atmosphere and 6 atmospheres). At these operating conditions, solid paraformaldehyde, which is sufficiently comminuted to permit its introduction into the system, is added to the now heated medium at the inlet 16 of the heat exchanger 17 where it is thermally depolymerized into formaldehyde vapor which is entrained in the heat exchange medium and carried into the lower header 29. In the lower header 29, the formaldehyde vapor is passed through the conduits 33 into the upper header 28 where formaldehyde vapors are given off and pass through the risers 32 to collect in the collection vessel 31.

In one example, the addition of paraformaldehyde and the subsequent formation of formaldehyde vapors was continued until the pressure in the collection vesel at 150° C was 5 atmospheres (60 psig). At this point, the addition of paraformaldehyde to the heat exchange medium was terminated although circulation of the medium was continued. The formaldehyde vapor was maintained in the collection vessel 31 until, upon demand, it was moved by the force of its own pressure to the reaction chamber. The same process can be utilized over the pressure range of 1 atmosphere to 6 atmospheres for formaldehyde vapor at the operating temperatures of about 120° to 200° C discussed above, which are sufficient to prevent polymerization and are within the desired safety range.

EXAMPLE II

Apparatus of the type illustrated in the FIGURE and used in Example I is utilized to generate and collect vaporized formic acid. The general operation of the generator 11 is as described in Example I. For formic acid the operating temperature should be about 100° C at atmospheric pressure and 150° C from about 2 to 3 atmospheres. The preferred operating temperature for this example was 150° C and the storage pressure was maintained at between about 2 and about 3 atmospheres at the operating temperature of 150° C.

In one example, liquid formic acid was introduced into the heated heat exchange medium and when the pressure of 2 atmospheres was achieved in the collection vessel 31, the addition of formic acid was stopped. The same procedure would be used for formic acid vapor within the preferred range of slightly greater than atmospheric pressure (for a positive pressure when the reaction chamber is at 1 atmosphere) to about 3 atmospheres at the desired operating temperatures of about 100° to 150° C as described above. Vaporized formic acid is held in the collection vessel 31 until, upon demand, it was driven by the force of its pressure to the reaction chamber for the treatment of cellulosic fibers in the presence of the vaporized formaldehyde prepared in Example I. The same process, of course, can be utilized for any process requiring one or more vaporized reactants.

Due to the vapor pressures of the formaldehyde vapor and the formic acid vapor there results a wide difference in allowable storage pressure for the two compositions. Accordingly, it is desirable that the formic acid vapor and the formaldehyde vapor be generated and stored under pressure in separate generators. However, in the proper case, it is within the scope of this invention to generate and store under pressure mixtures of reactants provided, of course, that the reactants are inert to each other while vaporized and stored in the collection vessel 31. It is also highly preferred to oversize the collection vessel 31 in order to maintain an adequate reserve of vaporized reactant so that storage pressure is not lowered to the point that it is equal to the reaction chamber pressure thereby eliminating the driving force from the collection vessel to the reaction chamber.

It can be seen that the method and apparatus of the present invention provides for the generation and pressurized storage of vaporized reactants which are available upon demand to the reaction chamber. In accordance with the present invention, a reserve of vaporized reactants is provided so that sufficient proportions of vaporized reactants are available for subsequent reaction and undesirable fluctuations and availability of reactants to the reaction chamber are avoided.

From the foregoing description, it is readily apparent how the present invention accomplishes its various objectives. While the invention has been described and illustrated herewith with reference to certain preferred embodiments thereof, it is to be understood that it may be otherwise embodied within the scope of the appended claims.

I claim:

1. A process for the generation and storage of a vaporized reactant composition for subsequent utilization of said vaporized reactant in a vapor phase reaction, said process comprising:

heating a fluid heat exchange medium to an operating temperature above the vaporization temperature of said reactant;

introducing said reactant in non-vaporized form into said heat exchange medium and maintaining said heat exchange medium and reactant under confined conditions so that said reactant is at least partially vaporized in said medium and said vapors are entrained therein said heat exchange medium being substantially non-volatile at said operating temperature and inert with respect to said reactant;

expanding said heat exchange medium containing vaporized reactant in an expansion chamber and permitting at least a portion of said reactant vapors to escape from said heat exchange medium in said expansion chamber;

leading said reactant vapors to a collection vessel, said collection vessel interior being maintained at a temperature above the vaporization temperature of said reactant;

maintaining said reactant vapors in said collection vessel at a selected pressure, said pressure level being less than the pressure required to condense said reactant vapors at the temperature maintained in said collection vessel said pressure in said collection vessel being generated by said vaporized reactant collected therein; and terminating the introduction of said reactant into said heat exchange medium when said pressure in said collection vessel reaches substantially said selected pressure level while continuous circulation of said heat exchange medium through said expansion chamber is maintained, whereby said vaporized reactant is maintained in said collection vessel at a temperature and at said selected pressure level.

2. The process of claim 1 wherein both said expansion chamber and said collection vessel interior are maintained substantially at said operating temperature by said heat exchange medium.

3. The process of claim 1 wherein said heat exchange medium is selected from the group consisting of a mixture of diphenyl oxide and diphenyl and dibutyl phthlate.

4. The process of claim 1 wherein said vaporized reactant is formaldehyde.

5. The process of claim 4 wherein said operating temperature is at least 120° C in order to prevent premature polymerization of said formaldehyde.

6. The process of claim 4 wherein said formaldehyde vapor is maintained in said collection vessel at a temperature in excess of 120° to about 200° C at a pressure level greater than 1 atmosphere up to about 6 atmospheres.

7. The process of claim 1 wherein said vaporized reactant is formic acid.

8. The process of claim 7 in which said operating temperature is in excess of about 100° C.

9. The process of claim 7 wherein said formic acid vapors are maintained in said collection vessel at a temperature of on the order of about 100° to 150° C and at a pressure level greater than 1 atmosphere up to about 3 atmospheres.

10. The process of claim 1 in which a drop in pressure in said collection vessel is compensated for by increasing the amount of heat exchange medium containing vaporized reactant flowing into said expansion chamber to provide additional vaporized reactant in said collection vessel and return the collection vessel pressure to said selected pressure.

* * * * *